United States Patent
Arikawa

[11] Patent Number: 5,127,501
[45] Date of Patent: Jul. 7, 1992

[54] APPARATUS FOR CONTROLLING ENGINE IDLE SPEED IN A VEHICLE HAVING AN ANTI-SKID BRAKE SYSTEM

[75] Inventor: Tetsuro Arikawa, Kanagawa, Japan
[73] Assignee: Nippon A B S Ltd., Japan
[21] Appl. No.: 593,340
[22] Filed: Oct. 1, 1990

Related U.S. Application Data

[63] Continuation of Ser. No. 112,661, Oct. 21, 1987, abandoned.

[30] Foreign Application Priority Data

Oct. 24, 1986 [JP] Japan .................... 61-253469

[51] Int. Cl.⁵ ............................................ B60K 41/20
[52] U.S. Cl. ............................ 192/1.22; 192/1.25; 192/1.45; 180/197; 364/426.02
[58] Field of Search ............ 192/1.22, 1.23, 1.24, 192/1.25, 1.45, 1.46, 1.47, 1.52; 180/197; 303/96, 97; 123/320; 364/426.02, 426.03

[56] References Cited

U.S. PATENT DOCUMENTS

| | | | |
|---|---|---|---|
| 3,680,655 | 8/1972 | Beyerlein et al. | 303/96 X |
| 3,802,528 | 4/1974 | Leiber | 180/197 X |
| 3,802,529 | 4/1974 | Burckhardt et al. | 303/96 X |
| 3,912,034 | 10/1975 | Pallof | 192/1.22 X |
| 3,938,611 | 2/1976 | Bertolasi | 180/197 |
| 3,938,612 | 2/1976 | Boudeville et al. | 364/426 X |
| 4,491,919 | 1/1985 | Leiber | 364/426 |
| 4,625,824 | 12/1986 | Leiber | 180/197 |
| 4,637,487 | 1/1987 | Nakamura et al. | 180/197 |
| 4,681,374 | 7/1987 | Nakamura et al. | 303/96 X |
| 4,682,667 | 7/1987 | Hosaka | 180/197 |
| 4,685,547 | 8/1987 | Ohashi et al. | 192/1.46 X |
| 4,703,823 | 11/1987 | Yogo et al. | 180/197 |

Primary Examiner—Richard Lorence
Attorney, Agent, or Firm—Jones, Day, Reavis & Pogue

[57] ABSTRACT

A brake adjusting apparatus for a vehicle includes an engine brake detector for detecting that the engine brake is applied; a drive wheel speed detector for detecting speed or acceleration of a drive wheel; a reference drive wheel speed setting circuit for setting a reference drive wheel speed or reference drive wheel acceleration to be compared with the output of the drive wheel speed detector; and an idle speed controller for controlling an idle speed of the engine, wherein the idle speed controller is so adjusted that the drive wheel is rotated at the reference drive wheel speed or the reference drive wheel acceleration, when engine brake application is detected by the engine brake detector.

4 Claims, 6 Drawing Sheets

APPARATUS FOR CONTROLLING ENGINE IDLE SPEED IN A VEHICLE HAVING AN ANTI-SKID BRAKE SYSTEM

This is a continuation-in-part of copending application Ser. No. 07/112,66 filed on Oct. 21, 1987 now abandoned.

BACKGROUND OF THE INVENTION

1. Field of the Invention

This invention relates to an apparatus for controlling engine idle speed for vehicles which have an anti-skid brake system.

2. Description of the Prior Art

When an accelerator pedal is released from being trodden under the gear connection for low speed such as first or second speed, on a low frictional road such as an icy road, the wheel speed or rotational speed $V_R$ of the drive wheel is often remarkably reduced in comparison with the running speed $V_F$ of the vehicle body, by the dragging torque of the engine or engine brake. In other words, the slip ratio $$S = \frac{V_F - V_R}{V_F} \times 100 \, (\%)$$

is increased, and there is sometimes the fear that the drive wheel locks.

When a brake pedal is trodden under the above described condition, the rotational speed $V_R$ of the drive wheel is reduced more and more, and so the slip ratio of the drive wheel is increased more and more, although the drive wheel is not locked by the engine brake. When the vehicle is provided with an anti-skid control apparatus, and the drive wheel is subject to the anti-skid control, the brake fluid pressure of the drive wheel cylinder of the wheel is so lowered that the rotational speed of the drive wheel is increased so as to attain the aimed slip ratio (for example, 10 to 30%). The braking frictional coefficient is the maximum within the range of the slip ratio of 10 to 30%. Further, the lateral slip frictional coefficient or so-called "side force" is not zero within the above range of the slip ratio, and accordingly, the braking efficiency is high, and the running stability of the vehicle is good.

However, under the above condition, the brake fluid pressure is reduced to nearly zero, or to zero. Further, the rotational speed of the drive wheel is hard to recover or reaccelerate due to the engine brake. Accordingly, the brake fluid pressure control time is lengthened, and so the braking force becomes insufficient. The braking distance is thereby lengthened. Further, the slip ratio is maintained high during that time. Accordingly, the side-force is small, and the running stability of the vehicle is bad. That is very dangerous.

SUMMARY OF THE INVENTION

Accordingly, it is an object of this invention to provide a brake adjusting apparatus for vehicles by which the bad influence of the engine brake can be avoided, and the control characteristics of the anti-skid control apparatus can be improved.

In accordance with an aspect of this invention, a brake adjusting apparatus for a vehicle comprises: an engine brake detector for detecting that the engine brake is applied; a drive wheel speed detector for detecting speed or acceleration of a drive wheel; a reference drive wheel speed setting circuit for setting a reference drive wheel speed or reference drive wheel acceleration to be compared with the output of said drive wheel speed detector; and an idle speed controller for controlling an idle speed of the engine, wherein said idle speed controller is so adjusted that said drive wheel is rotated at said reference drive wheel speed or said reference drive wheel acceleration, when the engine brake application is detected by said engine brake detector.

The following and other objects, features, and advantages of the present invention will be more readily understood upon consideration of the following detailed description of the preferred embodiments of the invention, taken in conjunction with the accompanying drawings.

DESCRIPTION OF THE PREFERRED EMBODIMENTS

Next, the anti-skid control apparatus provided with an adjusting apparatus according to one embodiment of this invention will be described with drawings.

First, the whole of the apparatus according to this embodiment will be described with reference to FIG. 1.

Figure 1:
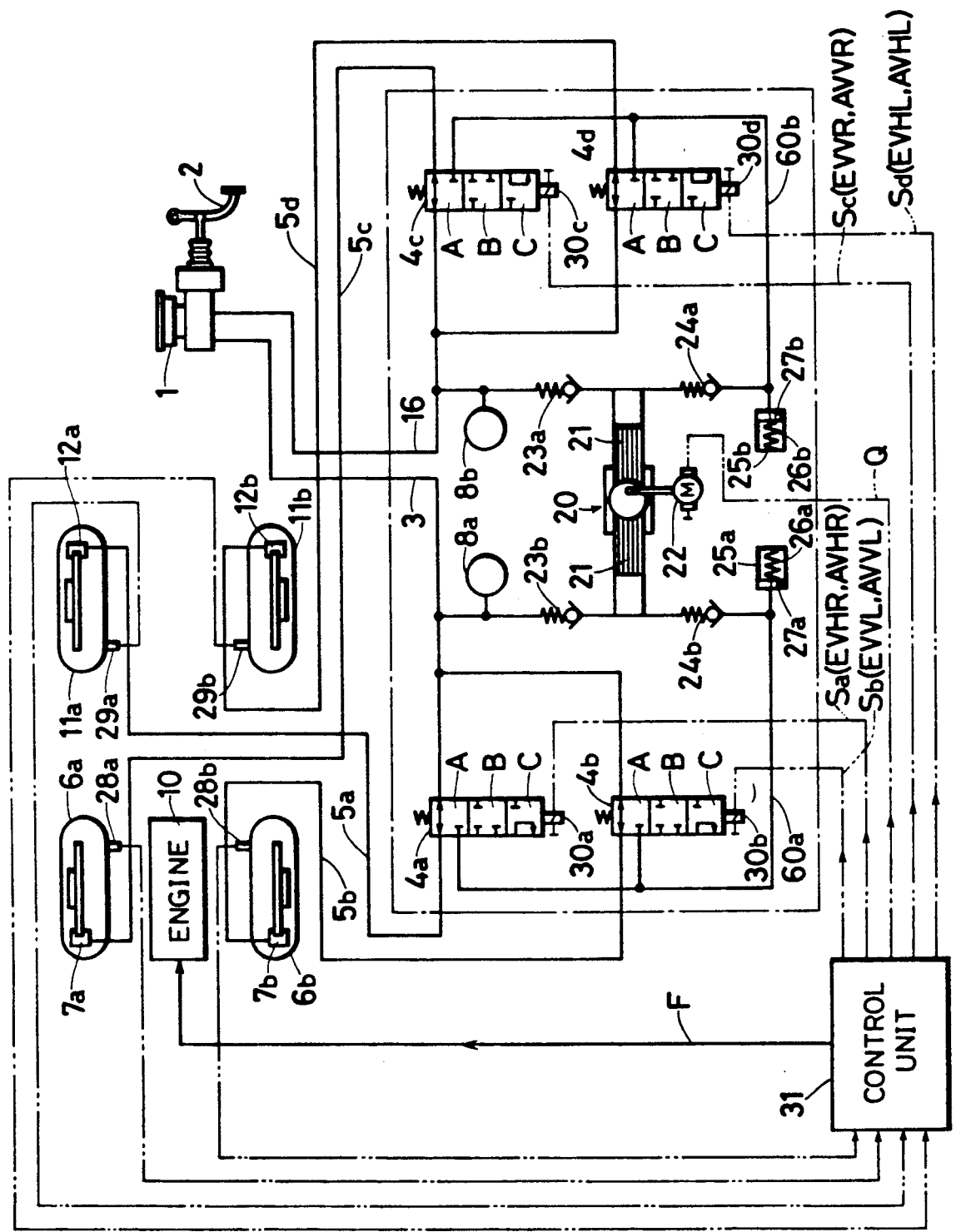
FIG. 1 is a schematic view of a conduit and circuit system of an anti-skid control apparatus with an adjusting apparatus according to one embodiment of this invention.

In FIG. 1, a brake pedal 2 is connected to a tandem master cylinder 1. One fluid pressure chamber of the tandem master cylinder 1 is connected to wheel cylinders 12a, 7b of a right rear wheel 11a and a left front wheel 6b through a conduit 3, electro-magnetic three position valve devices 4a, 4b and conduits 5a, 5b.

Another fluid pressure chamber of the tandem master cylinder 1 is connected to wheel cylinders 7a, 12b of front wheel 6a and a left rear wheel 11b through a conduit 16, electro-magnetic three position valve devices 4c, 4d and conduits 5c, 5d.

Discharge openings of the valve devices 4a, 4b, 4c and 4d are connected through conduits 60a and 60b to hydraulic reservoirs 25a and 25b, respectively. The hydraulic reservoirs 25a and 25b include pistons 27a and 27b slidably fitted to a casing and relatively weak springs 26a and 26b. Reserving chambers of reservoirs 25a and 25b are connected to suction openings of a fluid pressure pump 20.

Although the fluid pressure pump 20 is schematically shown, it consists of a pair of casings 21, pistons slidably fitted to the casings 21, an electro-motor 22 reciprocating the pistons, and check valves 23a, 23b, 24a, 24b. Supply openings of the fluid pressure pump 20 are connected to the conduits 3 and 16 and dampers 8a and 8b are connected to the conduits 3 and 16 to absorb pulsating pressure thereof.

Wheel speed sensors 28a, 28b, 29a and 29b are associated with the wheels 6a, 6b, 11a and 11b respectively, and they generate pulse signals having frequencies proportional to the rotational speeds of the wheels 6a, 6b, 11a and 11b. The pulse signals of the wheel speed sensors are supplied to a control unit 31.

The control unit 31 is described in detail hereinafter. It generates control signals Sa, Sb, Sc and Sd and motor-drive signal Q. Control signals Sa, Sb Sc and Sd are supplied to solenoid portions 30a, 30b, 30c and 30d of the valve devices 4a, 4b, 4c and 4d. Dash lines represent electric lead wires. The electro magnetic valves 4a, 4b, 4c and 4d take one of three positions A, B and C according to current levels of the control signals which are supplied to solenoid portions 30a, 30b, 30c and 30d thereof. When the control signals Sa, Sb, Sc and Sd are "0", the valve devices 4a, 4b, 4c and 4d take first positions A for increasing the brake pressure to the brake for the wheel, respectively. In the first position A, the master cylinder side and the wheel cylinder side are made to communicate with each other. When the control signals Sa, Sb, Sc, Sd are "½", the valve devices 4a, 4b, 4c and 4d take second positions B for maintaining the brake pressure to the brake at constant, respectively. In the second position B, the communications between the master cylinder side and the wheel cylinder side, and between the wheel cylinder side and the reservoir side are interrupted. When the control signals Sa, Sb, Sc, Sd are "1", the valve devices 4a, 4b, 4c, 4d take third positions C for decreasing the brake pressure to the brake, respectively. In the third position C, the communication between the master cylinder side and the wheel cylinder side is interrupted, while the communication between the wheel cylinder side and the reservoir side is made. The brake fluid is discharged through the conduits 60a, and 60b into the reservoirs 25a and 25b from the wheel cylinders 7a, 7b and 12a and 12b.

The control unit 31 further generates a drive signal Q for the motor 22. When anyone of the control signals Sa, Sb, Sc and Sd becomes initially "1", the drive signal Q is generated, and it is kept during the skid control operation. The drive signal Q is supplied to the motor 22. And in this embodiment, the front wheels 6a and 6b are driven by an engine 10. An output signal F for adjusting a throttle of the engine 10, as hereinafter described, is obtained from the control unit 31, too.

Next, the details of the control unit 31 will be described with reference to FIG. 2.

The control unit 31 receives the outputs of the sensors 28a, 28b, 29a, 29b to judge the skid conditions of the wheels 6a, 6b, 11a, 11b. The judge circuits for the respective wheels 6a, 6b, 11a, 11b are the same in construction. FIG. 2 shows only the judge circuit for the right front wheel 6a. It will be representatively described hereinafter. However, it is partially in common with the judge circuit for the left front wheel 6b of the same conduit system. Accordingly, only a part of the judge circuit for the left front wheel 6b is shown in FIG. 2. The signals from the wheel speed sensors 28a, 29a and 29b and 28b are supplied to wheel speed signal generators 61a, 61b, 61c and 61d. Digital or analogue outputs proportional to the wheel speeds are obtained from the wheel speed signal generators 61a, 61b, 61c and 61d and they are supplied to differentiators 62a, 62b, slip signal generators 72a, 72b and a slip ratio setting circuit 69. The circuit 69 is in common, in the judge circuits for all of the wheels. It consists of an approximate vehicle speed signal generator 66 and multipliers 67 and 68. The highest one of the outputs of the wheel speed signal generators 61a, 61b, 61c and 61d is selected, and an approximate vehicle speed signal is formed on the basis of the highest one, in the approximate vehicle speed signal generator 66. For example, multiplier numbers 0.85 and 0.70 are set in the multipliers 67 and 68, respectively. Output terminals of the slip ratio setting circuit 69 are connected to change-over circuits 70. In the circuits 70, movable contacts are normally connected to the output sides of the multiplier 68. An output terminal of the change-over circuit 70 is connected to the slip signal generators 72a, 72b. The outputs of the change-over circuit 70, are compared with the wheel speeds as the outputs of the wheel speed signal generators 61a and 61b, in the slip signal generators 72a and 72b. When the formers are smaller than the latters, the slip signal generators 72a and 72b generate slip signals λ. Since the judge circuits are the same for the left rear wheel 11b and right front wheel 6a, hereinafter only the judge circuit for the right front wheel 6a will be described.

The differentiator 62a receives the output of the wheel speed signal generator 61a and differentiates it with respect to time. The output of the differentiator 62a is supplied to a deceleration signal generator 63a, and to first and second acceleration signal generators 64a and 65a. A predetermined threshold deceleration (for example, −1.4 g) is set in the deceleration signal generator 63a, and it is compared with the output of the differentiator 62a. Predetermined threshold accelerations (for example, 0.5 g and 7 g) are set in the first and second acceleration signal generators 64a and 65a respectively and they are compared with the output of the differentiator 62a. When the deceleration of the wheel becomes larger than the predetermined threshold deceleration (−1.4 g), a deceleration signal −b is generated from the deceleration signal generator 63a. When the acceleration of the wheel becomes larger than the predetermined threshold acceleration (0.5 g) or (7 g), an acceleration signal +$b_1$ or +$b_2$ is generated from the acceleration signal generator 64a or 65a.

An output terminal of the first acceleration signal generator 64a is connected to negation input terminals (indicated by circle O) of AND gates 73a, 78a, and a first input terminal of an OR gate 82a. An output terminal of the AND gate 78a is connected to an input terminal of a pulse generator 80a and an input terminal of an AND gate 81a. An output terminal of the pulse generator 80a is connected to a negation input terminal of the AND gate 81a. A stepwise brake-increasing signal generator (U) is constituted by the pulse generator 80a, the OR gate 82a, and the AND gate 81a, and it generates pulse signals to slowly increase the brake pressure. The width of the first pulse is so designed as to be larger than that of the sequent pulses in the pulse generator 80a. Thus, the insufficiency of the braking force is prevented.

The output terminal of the deceleration signal generator 63a is connected to a second input terminal of the OR gate 82a. The output terminal of the AND gate 81a is connected to the third input terminal of the OR gate 82a. The output terminal of the slip signal generator 72a is connected to the other input terminal of the AND gate 73a. The output terminal of the AND gate 73a is connected to one input terminal of an OR gate 76a. An output terminal of an AND gate 75a is connected to another input terminal of the OR gate 76a. The output terminal of the deceleration signal generator 63a is connected to one input terminal of the AND gate 75a and an output terminal of an OFF delay timer 86a is connected to another input terminal of the AND gate 75a. The delay time of the OFF delay timer 86a is sufficiently long. Once the output of the OFF delay timer 86a becomes "1", it is maintained during the anti-skid control operation. An output terminal of the OR gate 76a is connected to an input terminal of the OFF delay timer 86a. Output terminals of the deceleration signal generator 63a, the first acceleration signal generator 64a, and the pulse generator 80a are connected to an OR gate 71a. The above described change-over circuit 70a is changed over by the output of the OR gate 71a.

The output terminal of the OR gate 82a is connected to one input terminal of an AND gate 83a, and the output terminal of the second acceleration signal generator 65a is connected to another negation input terminal. The output terminal of the AND gate 83a is connected to one input terminal of an AND gate 84a. The output terminal of the OR gate 76a is connected to another negation input terminal of the AND gate 84a.

The output terminal of the AND gate 75a is connected to an OFF delay timer 77a. The output terminal thereof is connected to a fourth input terminal of the OR gate 82a. another OFF delay timer 131a and further a negation input terminal of an AND gate 130a. The output terminal of the OFF delay timer 131a is connected to another input terminal of the AND gate 130a.

The judge circuit for the right front wheel 6a is constructed as above described. Three kinds of signals are taken out from this circuit. They will be denominated as shown in the right end of FIG. 2. The output signal of the AND gate 84a is denominated as EVVR, that of the OR gate 76a as AVVR, and that of the OFF delay timer 86a as AVZVR. The letter "V" means "front side", and the letter "R" means "right side".

The judge circuits for the left rear wheel 11b, the left front wheel 6b and the right rear wheel 11a are constructed in the similar manner, respectively. The three kinds of signals EVHL, AVHL; AVZHL are taken out from the judge circuit for the left rear wheel 11b, where the letter "H" means "rear side" and the letter "L" means "left side". Similarly, EVVL, AVVL, AVZVL and EVHR, AVHR, AVZHR are taken out from the judge circuits for the left front wheel 6b and the right rear wheel 11a, respectively.

Next, the adjusting circuit part according to this invention will be described with reference to FIG. 2.

The adjusting circuit part consists of a low speed selecting circuit 40, a comparison adjusting circuit 41, an idle speed controller 42 and an engine brake detector 43. The wheel speed signals of the front wheels 6a, 6b as the drive wheels are supplied to the low speed selecting circuit 40. The lower one $V_{SL}$ of the wheel speed signals is selected by the low speed selecting circuit 40 and it is supplied to the comparison adjusting circuit 41. The one output of the slip ratio setting circuit 69, therefore the output $V_{TH}$ of the multiplier 67 is supplied to another input terminal of the comparison adjusting circuit 41. As above described, 0.85 as the multiplier number is set in the multiplier 67.

When the first slip ratio is $\lambda 1$, it corresponds to the value of $(1-\lambda 1)$. When the output of the approximate vehicle speed generating circuit 66 is represented as $V_{Ref}$, $V_{TH}$ is equal to $V_{Ref}(1-\lambda 1)$. When the change-over circuit 70 is changed over from the shown position, it is supplied also to the slip signal generating circuits 72a and 72b. The output is designated as $V\lambda 1$ for the slip signal generating circuits 72a and 72b. In this embodiment, $V\lambda 1$, is equal to $V_{TH}$. The input signals $V_{SL}$ and $V_{TH}$ are compared with each other in the comparison adjusting circuit 41. When $V_{SL}$ is smaller than $V_{TH}$ ($V_{SL} < V_{TH}$), the circuit 41 generates a signal $\lambda D$, and it is supplied to the engine brake detecting circuit 43. A signal $\lambda s$ of a level in accordance with the difference between ($V_{TH} - V_{SL}$) is generated in the comparison adjusting circuit 41 and it is supplied to the idle speed controller 42.

Figure 3:
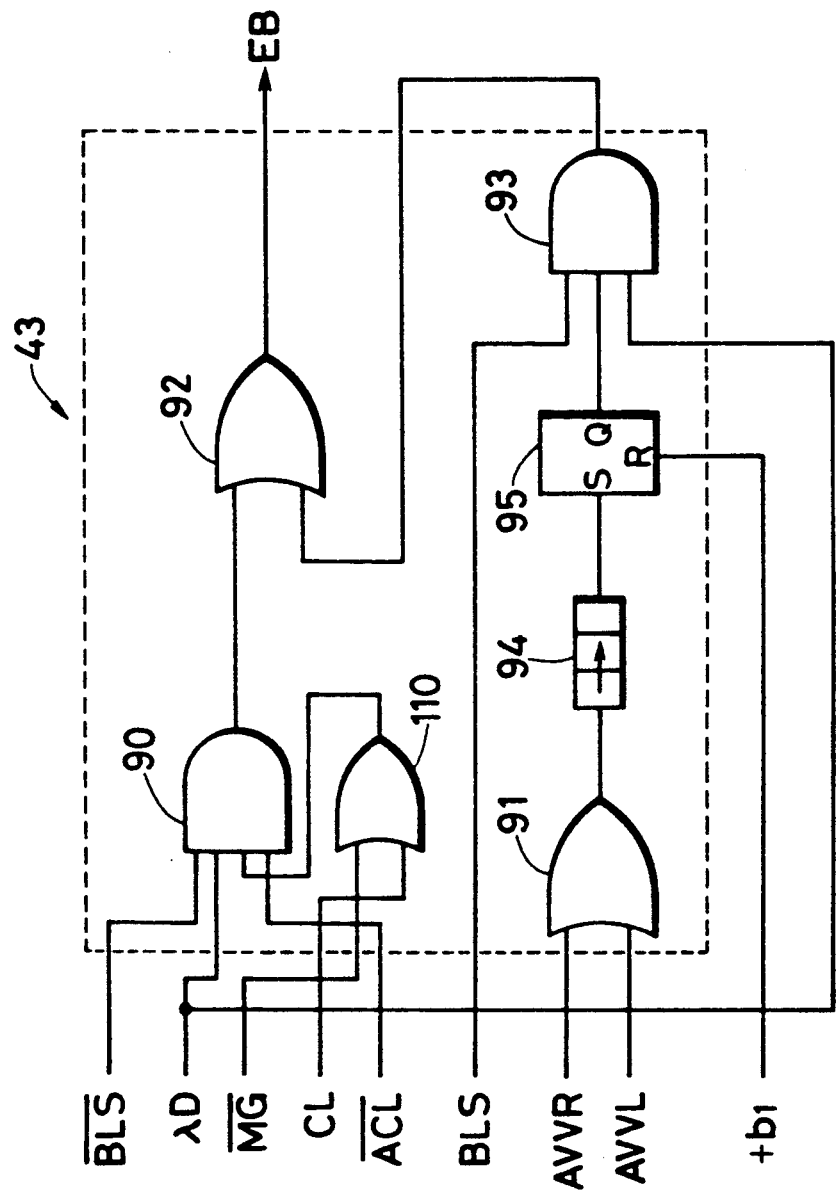
FIG. 3 is a circuit diagram of an engine brake detector in FIG. 2.

The details of the engine brake detecting circuit 43 is shown in FIG. 3. The eight signals are supplied to the detecting circuit 43. It consists of AND gates 90, 93, OR gates 91, 92, 110 an ON delay timer 94 and a flip-flop 95.

A signal $\overline{BLS}$ is supplied to a first input terminal to the AND gate 90. When the brake pedal 2 is not trodden, the signal $\overline{BLS}$ is at the level "1" of the two levels "0" and "1". And when the brake pedal 2 is trodden, the signal $\overline{BLS}$ is at the lower level "0" of the two levels. The one output $\lambda D$ of the comparison adjusting circuit 41 is supplied to a second input terminal of the AND gate 90. An output of the OR gate 110 is supplied to a third input terminal of the AND gate 90. And a signal $\overline{ACL}$ is supplied to a fourth input terminal of the AND gate 90. When the accelerator pedal is not trodden, the signal $\overline{ACL}$ is at the higher level "1" of the two levels. And when the accelerator pedal is trodden, the signal $\overline{ACL}$ is at the low level "0" of the two levels. A signal $\overline{MG}$ is supplied to an input terminal of the OR gate 110 and a signal CL is supplied to another input terminal of the OR gate 110. When the transmission gear is located at the neutral gear position, the signal $\overline{MG}$ is at the lower level "0" of the two levels. And when the transmission gear is located at an other position than the neutral gear position, the signal $\overline{MG}$ is at the higher level "1" of the two levels. When the clutch is disconnected, the signal CL is at the low level "0" of the two levels, and when it is connected, the signal CL is at the high level "1".

The outputs AVVR and AVVL of the judge circuit part are supplied to input terminals of the OR gate 91. An output terminal of the OR gate 91 is connected through an ON delay timer 94 to a set terminal S of the flip-flop 95. The output $+b_1$, of the acceleration signal generator 64a of the judge circuit part is supplied to a reset terminal R of the flip-flop 95. A Q-output terminal of the flip-flop 95 is connected to a second input terminal of the AND gate 93. A signal BLS is supplied to a first input terminal of the AND gate 93. And the output signal $\lambda D$ is supplied to a third input terminal of the AND gate 93. When the brake pedal 2 is trodden, the signal BLS is at the higher level "1". When the brake pedal 2 in not trodden, it is at the low level "0".

The output terminals of the AND gates 90 and 93 are connected to input terminals of the OR gate 92. An engine brake detecting signal EB is obtained from the output terminal of the OR gate 92. When the engine brake is applied, the signal EB is at the higher level "1", and when the engine brake is not applied, the signal EB is at the low level "0". The signal EB is supplied to the idle speed controller 42. The delay time of the ON delay timer 94 is so long that it may be judged that the engine brake lengthens the brake relieving signals AVVR or AVVL.

Figure 4:
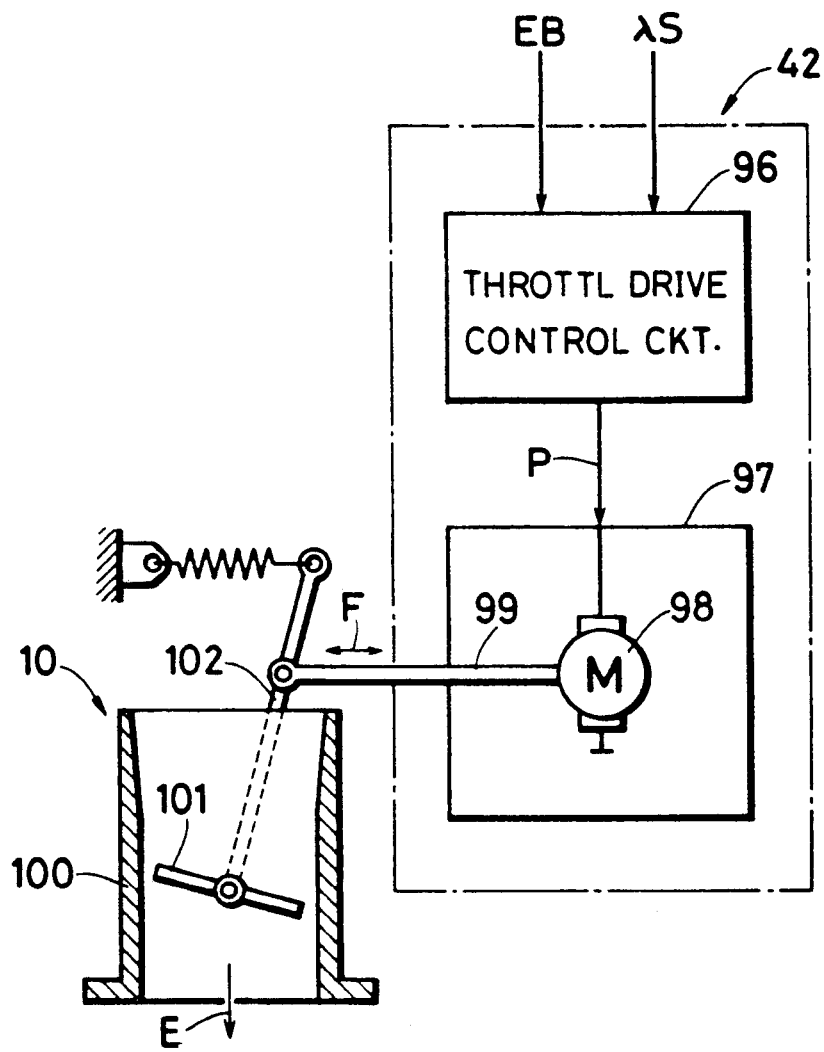
FIG. 4 is a circuit diagram of an idle speed adjusting circuit in FIG. 2.

Next, the idle speed controller 42 will be described with reference to FIG. 4.

The idle speed controller 42 consists mainly of a throttle drive control circuit 96 and a throttle drive part 97. The above signals EB and $\lambda_S$ are supplied to the control circuit 96. The throttle drive part 97 includes a DC motor 98. A drive shaft 99 is driven by a rotary shaft of the DC motor 98. It is connected as an output axis to the engine 10. When the signal EB is 1, the throttle drive control circuit 96 generates an output P of a level in accordance with the level of the signal $\lambda s$. The DC motor 98 is driven with the output P. It is rotated by an angle in accordance with the output P. The drive shaft 99 is moved leftwards or rightwards in accordance with the rotational angle of the DC motor 98. Only a part of the engine 10 is shown in FIG. 4. A throttle plate 101 is arranged in a throttle cylinder 100. The throttle plate 101 is attached to the end of a rod 102. The rod 102 is pivoted to the shaft 99. The rod 102 is rotated with the movement of the drive shaft 99 so that the flow amount of fuel gas into the engine room E is controlled by the inclination of the throttle plate 101. The opening angle of the throttle plate 101 is increased with the level of the signal $\lambda s$ so that the flow amount of the fuel gas into the engine room E, is increased.

Figure 2:
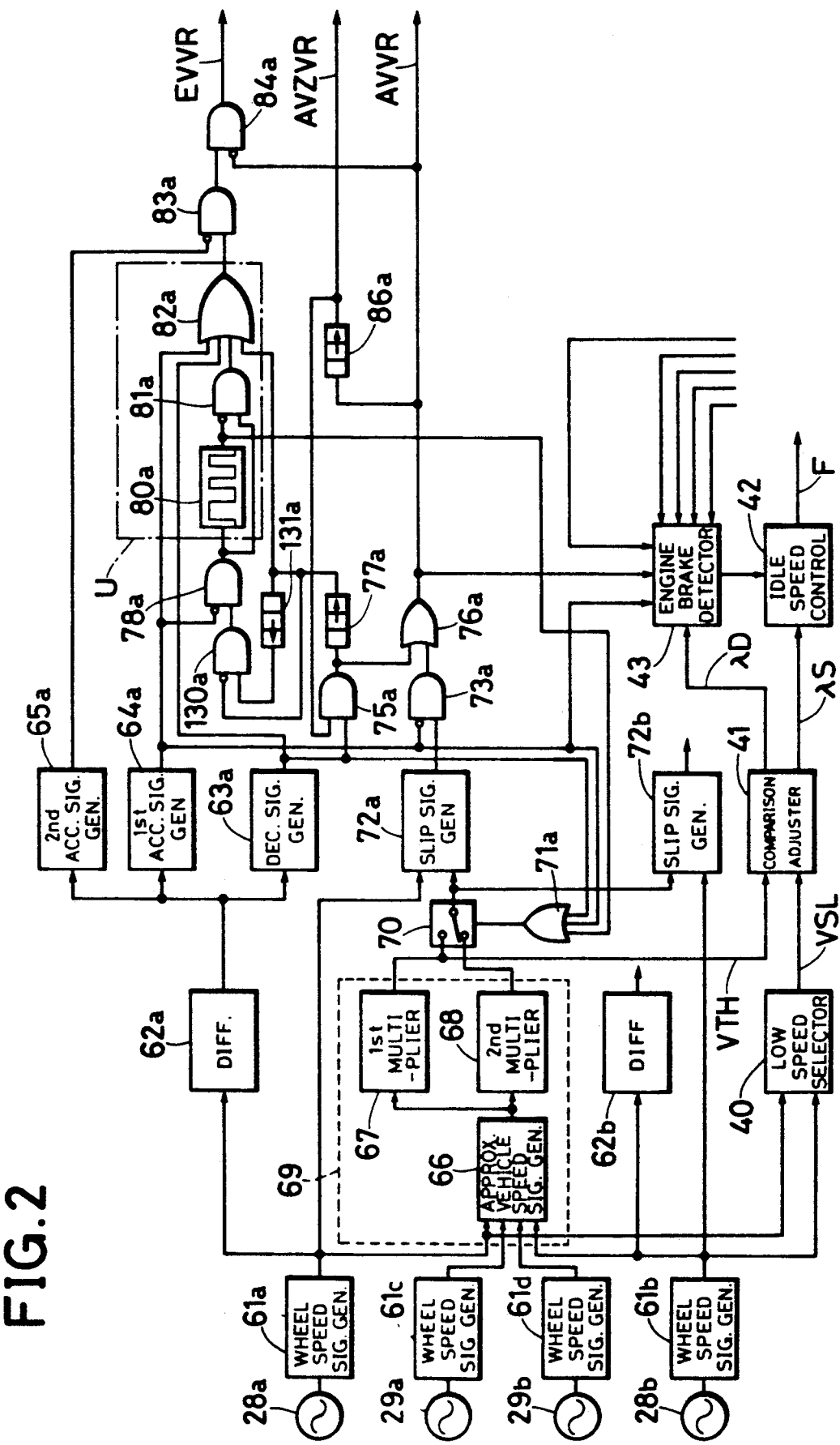
FIG. 2 is a block diagram of a control unit in FIG. 1, which consists of a judge circuit part and an adjusting circuit part.
Figure 5:
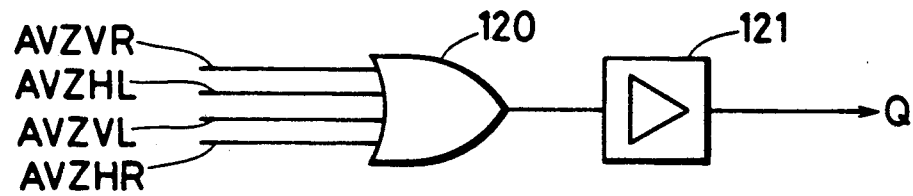
FIG. 5 is a circuit diagram of a motor drive circuit part of the control unit in FIG. 1.

The control unit 31, although not shown in FIG. 2, includes a motor drive circuit. It is shown in FIG. 5. It consists of an OR gate 120 and an amplifier 121. The above output signals AVVR, AVZHL, AVZVL and AVZHR are supplied to four input terminals of the OR gate 120. When anyone of the output signals is generated, the output of the OR gate 120 becomes "1" and it is amplified by the amplifier 121 to generate the drive signal Q for driving the motor 22.

Next, operations of the above described anti-skid control apparatus will be described.

It is now assumed that the automobile or vehicle runs on the road of the low frictional coefficient, and that the driver has separated the foot from the accelerator pedal with the clutch connected at the first gear position speed.

Although the brake pedal 2 is not trodden, the wheel speed of the front wheels 6a and 6b as the drive wheel are decreased with the engine brake applied and the lower one $V_{SL}$ of the wheel speeds becomes lower than the reference speed $V_{TH}$. Accordingly, the signal $\lambda D$ becomes "1" in FIG. 3. The output of the AND gate 90, and therefore the output of the OR gate 92 becomes "1". Accordingly, the idle speed controller 42 shown in FIG. 4 becomes operative. The opening angle of the throttle plate 101 of the engine 10 is adjusted in accordance with the level of the signal $\lambda S = V_{SL} - V_{TH}$. The flow amount of the fuel gas is increased with the inclination angle of the throttle plate 101, so that speed of the front wheels 6a and 6b is increased and is approached to the reference speed $V_{TH}$. Accordingly the engine brake is prevented from being applied too much and so the wheels can be prevented from locking. Further the running stability of the vehicle can be obtained.

When the accelerator pedal is relieved from treading and at once the brake pedal 2 is trodden, the signal BLS in FIG. 3 becomes "1", but the signal $\lambda D$ does not still become "1". However, the pressure of the wheel cylinders 7a, 7b, 12a, 12b of the wheels 6a, 6b, 11a and 11b are increased with the treading of the brake pedal 2. The wheel speed is reduced with the engine brake and brake pedal treading. Meanwhile, the signal $\lambda D$ becomes "1". The slip of the wheel becomes higher than the first predetermined slip ratio and the output AVVR of the OR gate 76a becomes "1" in FIG. 2. This signal is from the right front wheel 6a. The signal AVVL from the left front wheel 6b becomes "1", too. Accordingly, the output of the OR gate 91 in FIG. 3 becomes "1". The rotational speed of the wheel is much reduced with the engine brake and the treading of the brake pedal 2. Accordingly, the signal AVVR or AVVL continues for long time. The continuation time of the signal AVVR or AVVL becomes longer than the delay time of the ON delay timer 94. Thus, an input to the set terminal of the flip-flop 95 becomes "1" and so the Q output of the flip-flop 95 becomes "1". It is supplied to the AND gate 93. Accordingly, the output signal EB of the OR gate 92 becomes "1".

Accordingly, the throttle plate 101 of the engine 10 is rotated in accordance with the difference between the lower one $V_{SL}$ of the rotational speeds of the front wheels 6a and 6b and the reference speed $V_{TH}$. The supply amount of fuel gas into the engine room E is increased to rise the rotational speed of the wheels. Thus, the speed of the wheel is recovered. Meanwhile, the brake relieving signals AVVR and AVVL disappear. It is now assumed that the deceleration signal −b is generated to maintain the brake at constant, before the brake relieving signal AVVR and AVVL are generated. Accordingly in FIG. 2, after the brake relieving signal disappears, the output EVVR becomes "1" by function of the OFF delay timer 77a. Also the brake holding signal EVVL of the other front wheel becomes "1", but hereinafter only the right front wheel will be described for facilitating the description. Thus, the brake is maintained at constant.

An acceleration signal $+b_1$, is generated at a certain time. When it disappears, the pulse generator 80a operates for the delay time of the OFF delay timer 131a shown in FIG. 2 and so the output EVVR changes as "1", "0", "1", .... Accordingly, the brake is increased stepwisely. In FIG. 3, the flip-flop 95 is reset with the generation of the acceleration signal $+b_1$.

Figure 6:
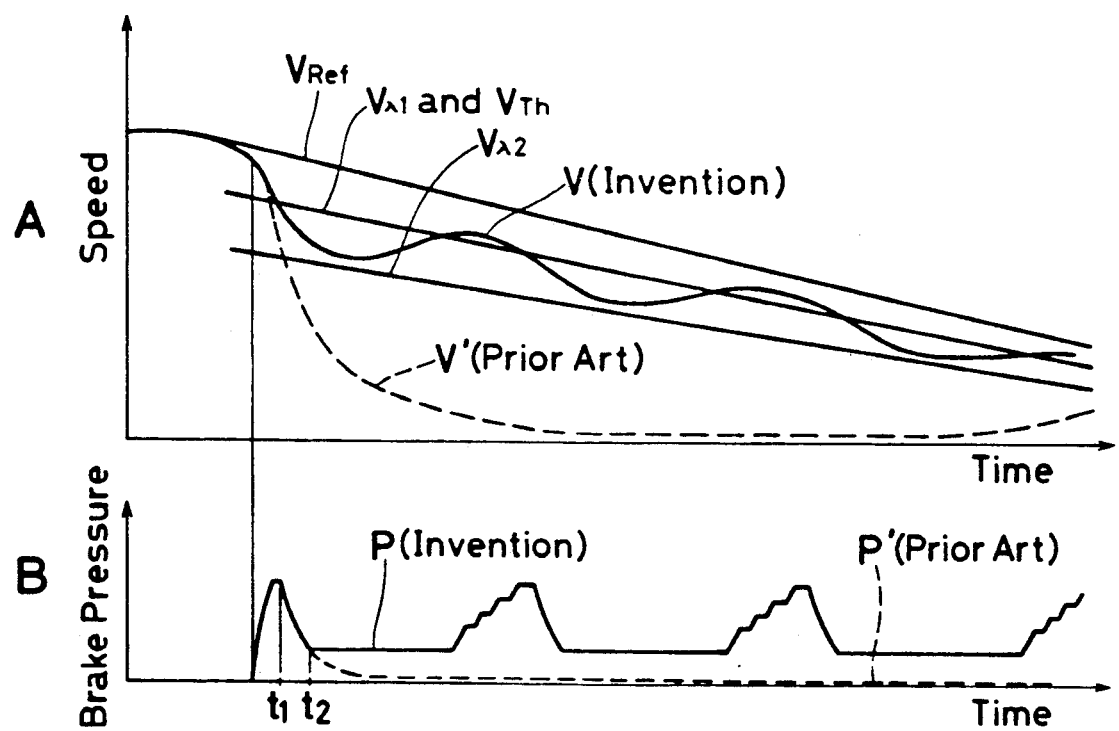
FIG. 6 is a graph for explaining operations of this embodiment.

FIG. 6 is a graph representing the above described operations. The wheel speed V of the front wheels 6a, 6b as the drive wheels changes as shown by the solid line in FIG. 6A. In FIG. 6A, $V_{Ref}$ represents the approximate vehicle speed, $V\lambda 1$ ($V_{TH}$) the first reference slip (the reference drive wheel speed) and $V\lambda 2$ the second reference slip.

In FIG. 6B, the brake fluid pressure P according to this invention changes as shown by the solid line. The time t1 to t2 is longer than the delay time of the ON delay timer 94 shown in FIG. 3. However, according to the prior art, the brake pressure relieving time is longer much more as shown by the dash line P' in FIG. 6B. The brake pressure becomes nearly zero or almost zero. Because the engine brake and the brake obtained by treading the brake pedal 2 are added to each other and so the rotational speed of the drive wheels are reduced much as shown by the dash line V' in FIG. 6A. The rotational speed V of the drive wheel is lower than the reference slips $V\lambda 1$ and $V\lambda 2$. Accordingly, the braking distance is lengthened much and further the running stability of the vehicle is bad.

However, according to this invention, the wheel speed the drive wheel changes as shown by the solid line and the brake pressure changes as shown by the solid line in FIG. 6B. Accordingly, the braking distance can be shortened and the running stability of the vehicle is good. Thus, the desirable anti-skid control can be effected.

While the preferred embodiment has been described, variations thereto will occur to those skilled in the art within the scope of the present inventive concepts which are delineated by the following claims.

For example, in the above embodiment, the change-over valves 4a, 4b, 4c, 4d are provided for the wheels 6a, 6b, 11a, 11b, respectively and the respective wheels 6a, 6b, 11a, 11b are independently controlled. Instead, the change-over valves are provided for the front wheels 6a, 6b respectively but only one change-over valve may be provided in common for the rear wheels. In other words, the change-over valves may be three. Or the change-over valves may be provided only for the front wheels respectively. In other words, the change-over valves may be two. Or the change-over valves may be provided only for the rear wheels. Further, the one change-over valve may be provided for the front and rear wheels of the same conduit system in which the front and rear wheels are diagonally connected.

Further in the above embodiment, this invention is applied to the vehicle of the drive front wheel type. However, it may be applied also to a vehicle of the drive rear wheel type or four wheel drive type. Further in the above embodiment, the four wheel vehicle has been described. However, this invention may be applied to a two wheeled vehicle.

Further in the above embodiment, the idle speed is so adjusted that the lower one $V_{SL}$ of the speeds of the drive wheels is approached to the reference drive wheel. Instead the idle speed may be so adjusted that the higher one of the speeds of the drive wheels is approached to the reference drive speed. Or it may be so adjusted that the average of the speeds of the drive wheels or a drive wheel speed corresponding to the average is approached to the reference drive speed.

Further in the above embodiment, the idle speed is adjusted in accordance with the difference between the lower one of the rotational speeds of the drive wheels and the reference drive wheel speed. A throttle position sensor may be provided for detecting the position of the throttle and it may be confirmed that the throttle position has been securely changed on the throttle position-adjusting operation.

Further in the above embodiment, the reference drive wheel speed $V_{TH}$ is equal to the first reference slip $V\lambda 1$ for the anti-skid control operation. They may be different from each other. For example, the reference drive wheel speed $V_{TH}$ may be a speed proportional to the value $V\lambda 1$. Or it may have no relationship with the value $V\lambda 1$.

Further in the above embodiment, the idle speed is so adjusted that the rotational speed of the drive wheel is approached to the reference drive wheel speed. However, the idle speed may be adjusted in accordance with the acceleration of the drive wheel. In other words, the higher the acceleration is, the closer the throttle closes. And the higher the negative acceleration or deceleration is, the wider the throttle opens.

Further, the idle speed may be adjusted only on the low frictional road which has a large influence on the engine torque. The discrimination between the high frictional road the low frictional road can be effected, for example, by a vehicle deceleration detector (so called "G sensor"). When the vehicle deceleration is smaller than a predetermined value, the road is judged to be low frictional, and when the vehicle deceleration is larger than the predetermined value, the road is judged to be high frictional.

Further in the above embodiment, the rotational angle of the DC motor in the idle speed controller is controlled to adjust the position of the throttle for controlling the supply amount of fuel gas to the engine. Instead, a variable throttle may be controlled with the drive of the DC motor for controlling the supply amount of fuel gas to the engine. Or a fuel supply timing and a ignition timing may be controlled.

Further in the above embodiment, the circuit construction shown in FIG. 3 is used as the engine brake detector. Instead, another circuit construction shown in FIG. 7, FIG. 8, FIG. 9 or FIG. 10 may be used.

Figure 7:
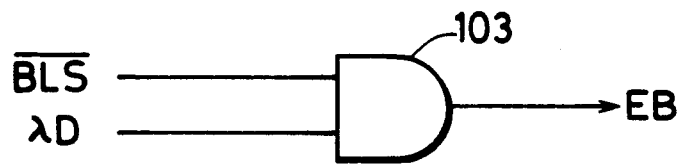
FIG. 7 to FIG. 10 are circuit diagrams of different modifications of the engine brake detector.

In FIG. 7, only the signal $\overline{BLS}$ and $\lambda D$ are supplied to an AND gate 103. The detecting output EB is obtained from the AND gate 103.

Figure 8:
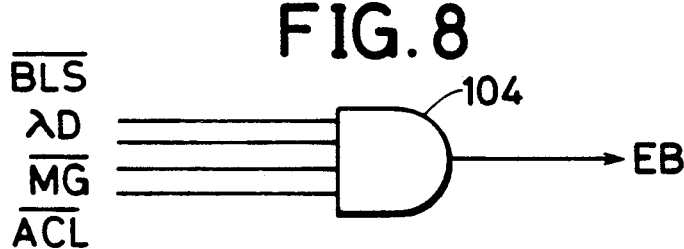

In FIG. 8, although this circuit construction is constituted by a part of the circuit construction of the above embodiment, the signals $\overline{BLS}$, $\lambda D$, $\overline{MG}$ and $\overline{ACL}$ are supplied to an AND gate 104. The detecting output EB is obtained from the AND gate 104.

Figure 9:
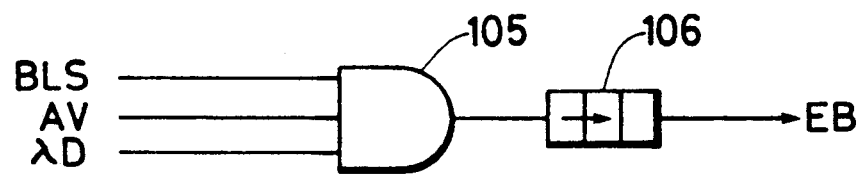

In FIG. 9, this modification consists of an AND gate 105 and an ON delay timer 106. The signals BLS, AV (representatively expressed for all of the wheels) and $\lambda D$ are supplied to the AND gate 104. When the AV signal continues for longer time than the delay time set in the ON delay timer 106, it is judged that the engine brake is applied.

Figure 10:
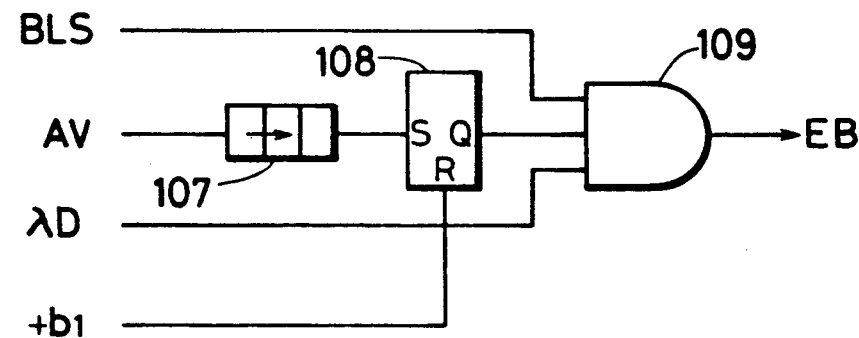

Although FIG. 10 shows a part of the circuit construction of the above embodiment, this modification consists of an ON delay timer 107, a flip-flop 108 and an AND gate 109. The similar signals to the above embodiment are supplied to the shown respective parts. The output of the AND gate 109 represents the signal that the engine brake is applied.

In FIG. 10, the flip-flop 108 may be omitted and the output of the ON delay timer 107 may be directly supplied to the second input terminal of the AND gate 109.

In short, the circuit construction of the engine brake detector may be selected in accordance with the required accuracy of the anti-skid control operation.

In the above embodiment, the approximate vehicle speed is normally equal to the rotational speed of the drive wheel, and it is decreased at a predetermined inclination after the drive wheel begins to decelerate at higher deceleration value than a predetermined deceleration value. A vehicle speed formed by a Doppler effect may be used.

Further in the above embodiment, the highest one of all of the wheel speeds is selected for forming the approximate vehicle speed. Instead, the higher one of the rotational speeds of the wheels connected diagonally to each other may be used.

Further in the above embodiment, the slip ratio is constant for forming the reference drive wheel speed. However it may be variable in accordance with the gear position of the transmission. For example, the reference drive wheel speed may be increased with the low grade of the low speed gears. Or that may be inverted. Or a slip value may be used instead of the slip ratio. The speed obtained by the subtraction of the slip value from the vehicle speed may be used as the reference speed.

What is claimed is:

1. An apparatus for controlling an idle speed of an engine in a vehicle adapted for driving on a road, the apparatus comprising:

a driven-wheel speed detector for producing an output that is a measure of the rotational speed of the driven wheel;

a vehicle speed detector for producing an output that is a measure of speed of the vehicle;

a reference driven-wheel speed setting circuit connected to the driven-wheel speed detector and to the vehicle speed detector for producing an output that differs by a predetermined value from the output of the vehicle speed detector;

a comparison adjuster for comparing the output of the reference driven-wheel speed setting circuit with the output of the driven-wheel speed detector and for generating a control output signal $\lambda D$ when the output of the driven-wheel speed detector is smaller than the output of the reference driven-wheel speed setting circuit;

an anti-skid brake apparatus in which a brake-relieving signal is generated when excessive brake force is applied and a brake fluid pressure is controlled by said brake-relieving signal for preventing said wheel from locking;

means for generating signals BLS, ACL, $\overline{MG}$, and CL indicative of the condition of said vehicle's brake pedal, accelerator pedal, transmission, and clutch, respectively;

an engine brake detector comprising (a) first detecting means to which is supplied a signal $\overline{BLS}$ representing the brake pedal not being operated, the control output signal $\lambda D$ from the comparison adjuster, a signal $\overline{ACL}$ representing the accelerator pedal not being operated, and at least one of a signal $\overline{MG}$ representing the transmission gear not being located at the neutral gear position and another signal CL representing the clutch being connected, said first means producing an output when all of said signals, $\overline{BLS}$, $\lambda D$, $\overline{ACL}$, and $\overline{MG}$ or CL are generated, (b) second detecting means to which is supplied a signal BLS representing the brake pedal being operated, the brake-relieving signal from the anti-skid brake apparatus and the control output signal $\lambda D$ from said comparison adjuster, said second means producing an output when all of said signals BLS, $\lambda D$, and said brake-relieving signal are generated continuously for longer than a predetermined time, and (c) third detecting means to which said outputs of the first and second means are supplied and which produces an output EB when at least one of said outputs from said first and second means is generated; and an idle speed controller for controlling an idle speed of the engine which receives a control output signal $\lambda S$ from said comparison adjuster and said output EB from said engine brake detector, said idle speed controller being so adjusted that said driven-wheel is rotated at said reference driven-wheel speed when the engine brake application is detected by said engine brake detector.

2. An apparatus according to claim 1 wherein said anti-skid brake apparatus controls the brake fluid pressure on the basis of both a slip reference speed with a predetermined slip value or slip ratio to the vehicle speed and the driven-wheel speed, and further wherein said slip reference speed is related to said reference driven-wheel speed.

3. An apparatus according to claim 2, wherein said slip reference speed is equal to said reference driven-wheel speed.

4. An apparatus according to claim 1, further comprising a vehicle deceleration detector for detecting when the road upon which the vehicle is driving has a low frictional coefficient, and wherein said idle speed controller is activated only when a road having a low frictional coefficient is detected.

* * * * *